(No Model.)

J. E. HUNTER.
FRICTION CLUTCH.

No. 585,271.                                Patented June 29, 1897.

Witnesses:
W. Petzer
John R. Taylor.

Inventor
James E. Hunter
by C. H. Williams
Attorney

THE NORRIS PETERS CO., PHOTO-LITHO., WASHINGTON, D. C.

UNITED STATES PATENT OFFICE.

JAMES E. HUNTER, OF NORTH ADAMS, MASSACHUSETTS.

FRICTION-CLUTCH.

SPECIFICATION forming part of Letters Patent No. 585,271, dated June 29, 1897.

Application filed July 24, 1895. Serial No. 557,050. (No model.)

*To all whom it may concern:*

Be it known that I, JAMES E. HUNTER, a citizen of the United States, residing at North Adams, in the county of Berkshire, State of Massachusetts, have invented a certain new and useful Improvement in Friction-Clutches, of which the following is a specification.

My invention relates to that class of friction-clutches in which one member is adapted to constantly rotate and to impart a motion of rotation to the other clutch member, which remains stationary when the clutch-faces are disengaged.

In my invention the clutching-faces may be carried by the constantly-rotating member or by the other member and are brought into frictional engagement with the second member of the clutch device by means of a toggle-lever movement which is connected and revolves with one member of the clutch.

The object of my invention is a simplified form of device which shall have all the advantages of clutches of this character previously in use and which at the same time will be economical of construction, of a reduced number of parts, and, by reason of the absence of parts likely to be worn out, of increased durability.

More in detail, my invention consists in providing a friction-shoe centrally pivoted with friction-faces arranged at opposite sides of its pivotal point in such manner that the friction-faces are adapted to engage upon opposite sides of a flange carried by the driven or driving member of the clutch and in operating this friction-shoe by a toggle movement applied at one end of the said shoe, whereby there is an equable distribution of pressure over the friction-faces and the friction-faces are adapted to engage with the driving or driven member of the clutch practically at all points at the same time, thus obviating undue wear upon said friction-faces. Further, by my arrangement it is possible to so overlap the friction-faces of the various friction-shoes that there will be substantially frictional contact between the driving and driven member over the entire clutch-faces of both.

Figure 1:
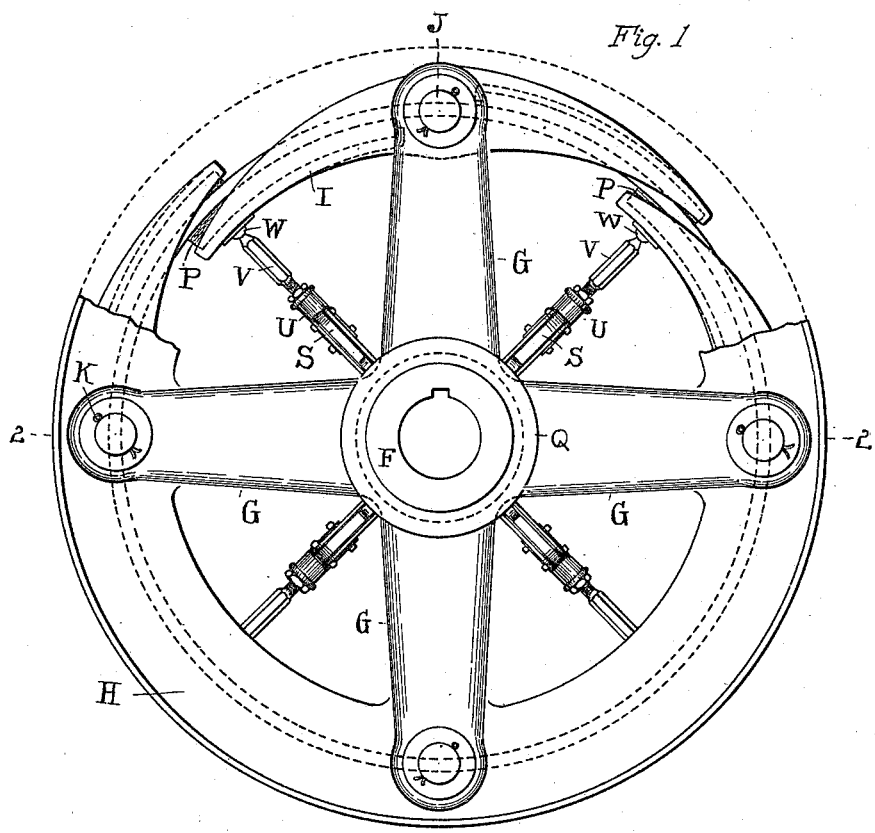
Figure 2:
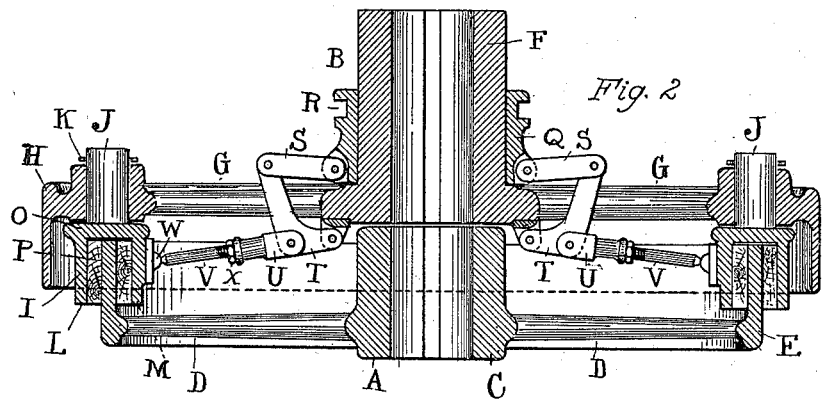

In the accompanying drawings, forming part of this specification, Figure 1 is an elevation of my improved clutch, the driving member being shown mainly in full lines and being partly broken away to show the driven member, which is shown partly in full lines and partly in broken lines; and Fig. 2 is a cross-section taken on line 2 2 of Fig. 1.

In the drawings, A represents the driven member of the clutch. The clutch in this instance serves as a coupling for the two sections of shafting.

B is the driving member; or the member A may be used as the driving and the member B as the driven member, depending upon which section of the shaft power is applied to. These parts are shown in the drawings as adapted to be keyed, the member A to a shaft to be driven and the member B to a shaft constantly in rotation. It is obvious, however, that the arrangement may be applied to fast and loose pulleys and other forms of apparatus in which one member communicates continuous rotary motion to another member. The driven member A is provided with a hub C, from which extend spokes D, carrying a rim or flange E, which rim or flange E is the part which is clutched by the driving member of the apparatus. The member B is likewise provided with a hub, which is lettered F, adapted to be keyed fast to the driving-shaft. From this hub radiate spokes G, which are connected together by an annular rim H. This rim, as shown, extends over the shoes I, and thus acts as a shield or guard to prevent the shoes catching in the clothing and causing injury, and in practical use this arrangement has been approved and found of value. It is obvious that the hub, spokes, and rim may be cast together.

Pivoted to the outer end of the spokes G is a friction-shoe I, the pivot J of which is secured in place by the key K. This shoe, in rear elevation, is of substantially the outline shown to the right in Fig. 1. In cross-section said shoe is provided, as best shown in Fig. 2, with an upper and lower flange L and M and back plate O, all cast together. The flanges L and M are recessed, as shown in dotted lines in Fig. 1, to adapt them to receive wooden friction-blocks P, one of the said friction-blocks being arranged in such position on the friction-shoe as to engage with the under side of the flange E of the driven member of the clutch and the other being arranged to engage on the opposite side thereof, said blocks being arranged at opposite points of the pivot, as shown.

In order to operate the friction-shoe I, so as to cause the friction-blocks L and M to engage with the flange E of the driven member of the clutch, a toggle-joint arrangement is provided, operated by a sliding sleeve Q, carried on the hub B, which sleeve is caused to slide back and forth on the hub by the movement of a shipper-rod engaging the groove R. A link S, carried by this sleeve, is connected with the elbow-lever T, pivoted, as shown, on an ear $b$, projecting from the hub B, which elbow-lever carries a screw-socket U, into which is screwed the arm V, which engages with a piece W, carried on the lower side of the friction-shoe. A nut X permits of clamping the arm V, which, because of its screw connection, is adjustable, and hence adapted to take up any wear on the friction-blocks.

The operation of the device will be readily understood from the foregoing description. It is only necessary to say that when the shipper-rod is moved toward the right the toggle-joint will act to oscillate the friction-shoe on its central pivot, and thereby to bring the friction-blocks thereon into direct engagement with the rim of the driving member of the clutch. The reverse movement releases the clutching member. It will be seen that this arrangement permits of the frictional shoes overlapping one another, so that a continuous frictional contact may be obtained between the driving and driven members of the clutch, and that by reason of the application of the toggle-lever movement to one end of a centrally-pivoted shoe ease of operation is secured, while at the same time the shoe itself does not require to be supplied with friction-blocks, which are themselves pivoted to adapt them to the contour of the rim to be clutched. Hence wear and tear upon the pivot-points of such blocks are avoided, while a direct clamping or clutching action is effected between friction-blocks rigidly carried by the friction-shoes.

What I claim is—

In a friction-clutch, the combination of a driving and driven member, one of said members being provided with a series of friction-shoes, each one centrally pivoted and overlapping its neighbor, a series of toggle-levers, each acting on one end of a shoe, means for operating said toggle-lever movement simultaneously, and friction-blocks rigidly carried by the shoes, substantially as set forth.

This specification signed and witnessed this 2d day of July, 1895.

JAMES E. HUNTER.

Witnesses:
I. D. HUNTER,
H. D. NORDWELL.